Oct. 27, 1942.  L. POETON  2,300,310
TOOL
Filed Aug. 23, 1940  2 Sheets-Sheet 1
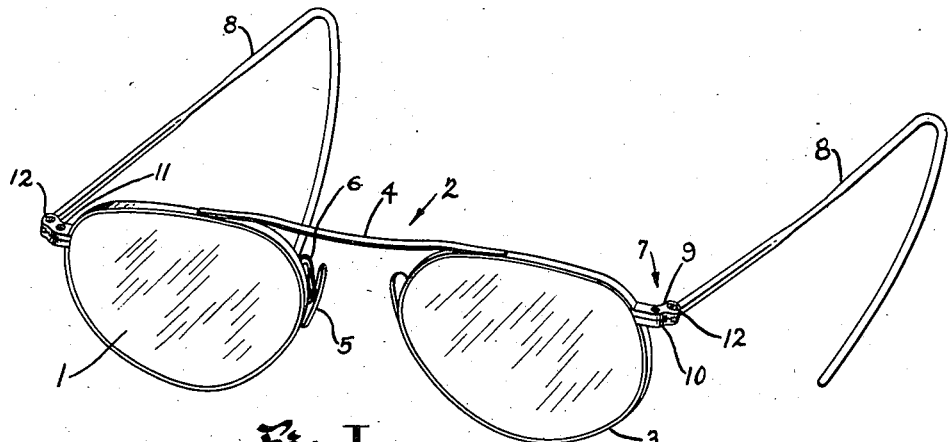
Fig. I
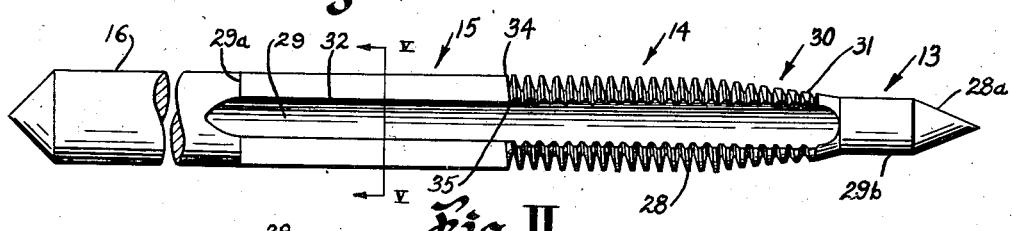
Fig. II
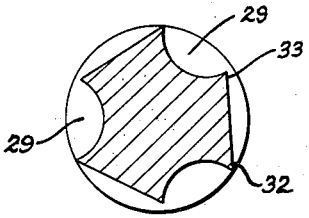
Fig. V
Fig. III
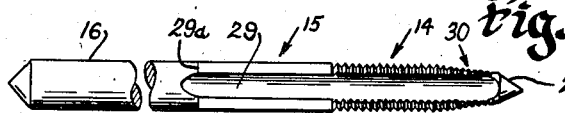
Fig. IV
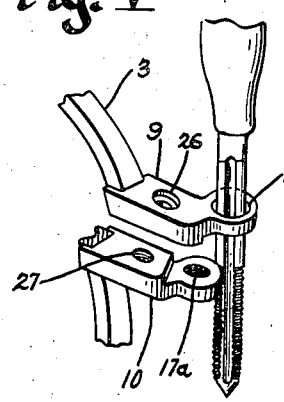
Fig. VI
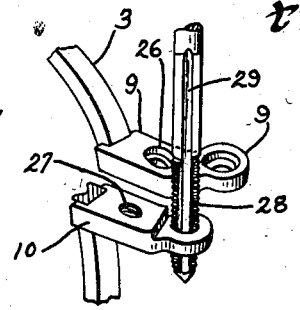
Fig. VII
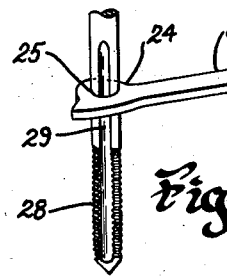
Fig. VIII
INVENTOR.
LAWRENCE POETON
BY
Louis K. Gagnon
ATTORNEY.

Oct. 27, 1942.  L. POETON  2,300,310
TOOL
Filed Aug. 23, 1940  2 Sheets-Sheet 2
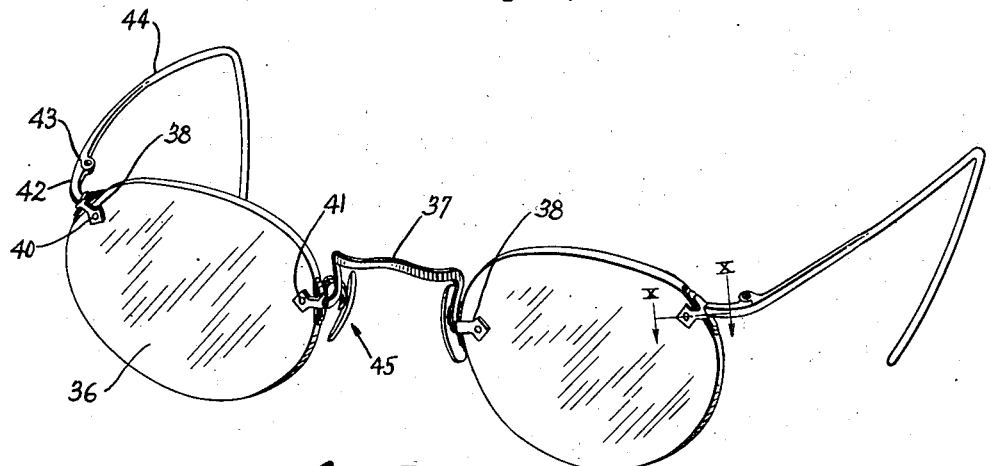
Fig. IX
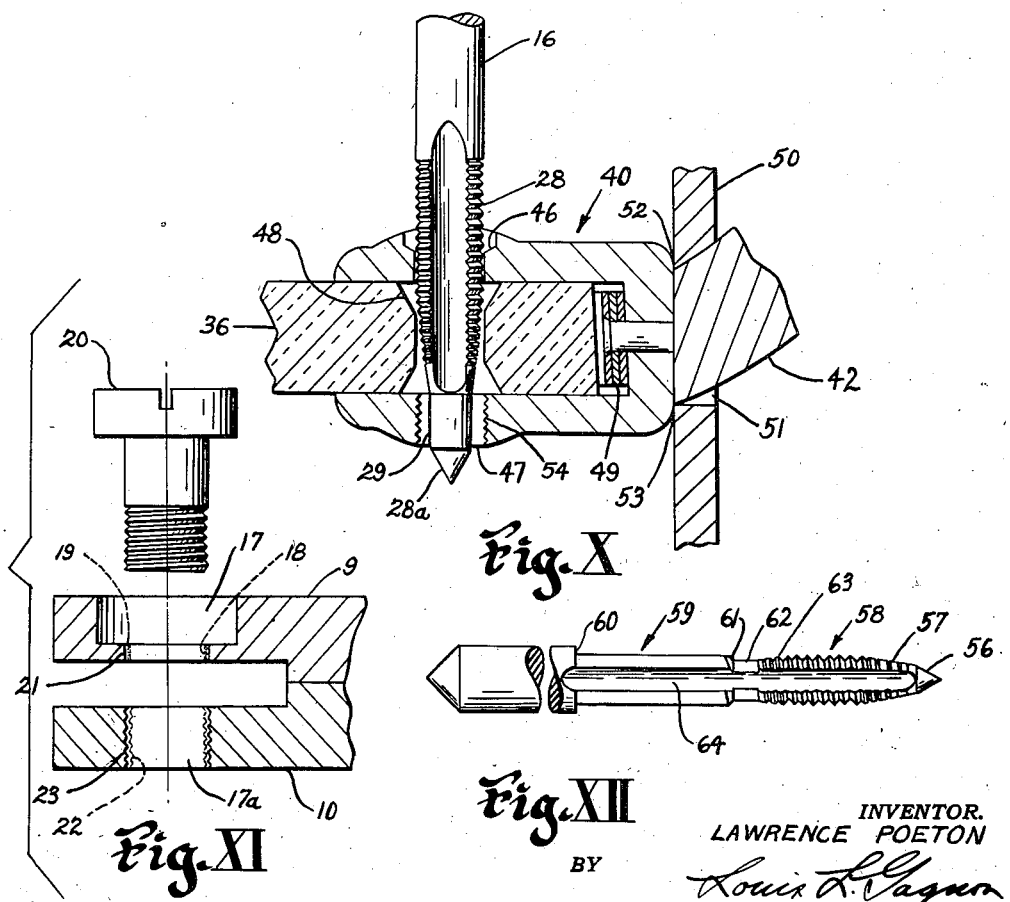
Fig. X
Fig. XI
Fig. XII
INVENTOR.
LAWRENCE POETON
BY
Louis L. Gagnon
ATTORNEY.

Patented Oct. 27, 1942

2,300,310

UNITED STATES PATENT OFFICE 2,300,310

TOOL

Lawrence Poeton, Southbridge, Mass., assignor to American Optical Company, Southbridge, Mass., a voluntary association of Massachusetts Application August 23, 1940, Serial No. 353,981

4 Claims. (Cl. 10—141)

This invention relates to tools and has particular reference to an improved tool and method of making and using same for processing the walls of an opening to prepare for the admittance of a holding member.

One of the principal objects of this invention is to provide an improved tool for processing the walls of an opening and the method of making same and accomplishing the process of preparing the opening for the admittance of a holding member.

Another object of this invention is to provide a tool for processing the walls of an opening having a portion thereof adapted to lead the remainder of the tool into the opening in desired relation therewith.

Another object is to provide a tool having means thereon adapted to lead the tool into an opening to properly align said opening in desired relation with another opening for the forming of a thread in said other opening whereby said tool may be removed, the openings held manually temporarily in said aligned position and a holding member thereafter inserted.

Another object is to provide means for so processing an opening having imperfect walls as to form them to efficiently receive holding means therein.

Another object of the invention is to provide means for so processing an opening having worn walls as to form them to fit oversize holding means.

Another object is to provide means for so processing imperfect or worn parts of an ophthalmic mounting as to renew their holding characteristics to original efficiency.

Another object is to provide means for retapping worn screw threads.

Another object is to provide a tool for processing worn endpiece and strap openings of an ophthalmic mounting whereby oversize holding members may be inserted in said openings and operate therein with the efficiency of the original screw.

Another object is to provide a tool adapted to form oversize threads.

Another object is to provide a tool having a lead-in portion, a tap portion and a clearing or reamer type portion.

Another object is to provide a tool for forming oversize screw threads comprising a lead-in portion and a tap portion.

Another object is to provide a tool for processing the walls of an opening to desired oversize comprising a top portion and a clearing or reamer portion.

Another object is to provide a tool of the character described with back off or cut away portions to facilitate cutting and removal of cut away material.

Another object is to provide a method of processing the walls of an opening comprising inserting in said opening a tool having a lead-in portion and a plurality of different types of cutting portions thereon, and urging both of said portions through said opening or openings.

Other objects and advantages of the invention will become apparent from the following description taken in connection with the accompanying drawings. It is apparent that many changes can be made in the details of construction, arrangement of parts and steps of the method shown and described without departing from the spirit of the invention as expressed in the accompanying claims.

I, therefore, do not wish to be limited to the exact disclosure herein as the preferred forms and steps of the method have been shown only by way of illustration.

In the past, difficulty has been encountered in attempting to retap endpiece or strap openings of ophthalmic mountings in such a way as to permit the insertion of an oversize screw in such a manner as to make it comparable in efficiency to the original screw. Attempts have been made with various types of tapping tools to properly retap a worn thread of this description and in some instances taps have been formed with lead-in members or points which were intended to ream or cut away the openings prior to the tapping thereof. These lead-in portions have, however, been sharp edged and reamerlike in form, and it has been found that the use of such tools does not provide an efficient connection since the lead-in portion does not properly lead the tool in and by cutting action tends to cause undesired oversized openings to be formed and improper fit and looseness of parts to exist.

Applicant's device obviates all of the prior art difficulties with these devices and is particularly directed to means for processing the walls of an imperfect opening so as to make them efficient as regards fitting and holding properties in connection with holding means.

Referring to the drawings:

Fig. I is a perspective view of an ophthalmic mounting embodying endpieces having openings which may be processed by the tool of this invention;

Fig. II is a side elevation of one tool of this invention showing the combination of the lead-in portion, the tap portion and the reamerlike portion;

Fig. III is a view similar to Fig. II illustrating a modification of the tool in which there is no reamerlike portion;

Fig. IV is a view similar to Fig. II with a modification of the lead-in portion;

Fig. V is a cross section of the tool taken on line V—V of Fig. II;

Fig. VI is a partial view in perspective of the endpiece portions as illustrated in Fig. I in separated relation and with the tool shown in operative relation with the upper portion of said endpiece;

Fig. VII is a view generally similar to Fig. VI with the tool in operative relation with the lower portion of the endpiece;

Fig. VIII is a perspective view of a portion of a temple adapted to be received in said endpiece with the tool in operative relation therewith;

Fig. IX is a view generally similar to Fig. I of a rimless type mounting embodying strap members having openings adapted to be processed by the tool of this invention;

Fig. X is an enlarged section taken on line X—X of Fig. IX and showing the tool in position of use; and Fig. XI is an enlarged sectional view of an endpiece such as is illustrated in Fig. I showing the effect of the different portions of the tools on the walls of the openings of the endpiece.

Fig. XII is a view similar to Fig. I showing an alternate construction.

The invention is directed particularly to the provision of a tool or tools for use in preparing the connection opening of the various parts of an ophthalmic mounting for the reception of repair screws or other similar connecting means and which also may be used for initial assembly work, particularly in instances when it is desired to position the parts in proper alignment for the reception of a repair screw and to insure proper thread bearing.

One of the primary embodiments of the invention, as shown in Fig. II, comprises a tool having a holding portion 16 progressing into a reamer portion 15, a tap portion 14 and a guide or lead-in portion 13. The above portions are progressively arranged so that during the use of the tool, the guide or lead-in portion 13 first enters the opening or openings to be reconditioned. This lead-in portion is designed to guide the tool into power operative position within the opening.

Referring to the drawings wherein like reference characters denote like parts throughout the several views, Fig. I illustrates one of the ophthalmic mountings with which the tools embodying the invention are used with the mounting comprising a pair of lenses 1 supported by a frame member 2 consisting of a pair of rims 3 and a bridge 4. Suitable nose pads 5 are attached to the mounting by means of arms 6 and split type endpieces 7 are provided adjacent the temporal edges of the rims 3 and have supported therein suitable temple members 8. The endpiece 7 comprises an upper portion 9 and a lower portion 10 held together for the purpose of holding the rim about the lens edge by a screw or other suitable holding means 11 and for holding the temple in position in the endpiece by another screw 12.

With this construction of ophthalmic mountings it is often necessary to replace the lenses either due to breakage or change of prescription and also to replace the temples or retighten the temple connections due to looseness and play which may occur during the use of the mounting. In replacing the lenses it is necessary to loosen the connection screw 11 in order to separate the divided portions of the lens rim 3 for the insertion or removal of lenses. In taking up the looseness and play in the temple hinge connection or in the replacement of the temples it is necessary to remove or tighten the connection screw 12. Repeated tightening or replacement of the screws causes the thread bearing of the endpiece to become worn to such extent that the screws can no longer be tightened or replaced.

It is desirable, when the screw threads of an endpiece opening such as shown become worn, to remove the original screw, retap the hole and insert an oversize screw to more efficiently hold the endpiece or the lens and lens strap together.

Another type of ophthalmic mounting with which the tools embodying the invention is used is known as a rimless type mounting such as illustrated in Fig. IX. This mounting comprises a pair of lenses 36, a bridge member 37, lens straps 38 having openings 40 therein and suitable holding means 41, such as a screw or the like, holding the lenses to the straps and therefore the bridge and the endpieces 42. The endpieces 42 have temple connection portions 43 and support temple portions 44. Suitable nose pads and supports 45 are connected to the bridge member 37.

In this type of mounting the screw connections which become worn are the screws of temple hinge connections 43 and the various connection screws 41 which connect the lens straps to the lenses. In processing the connection openings for the reception of repair screws in instances when the thread connections become worn different type tools ore used and it is these particular tools which embody the essence of the invention.

In preparing the connection openings of the endpieces 7 of the ophthalmic mounting illustrated in Fig. I for the reception of oversize repair screws a tool such as illustrated in Fig. II is preferably used. This tool comprises the holding portion 16, reamer portion 15, tap portion 14 and guide portion 13 and its use in this connection is as follows: The endpiece, as shown in Fig. VI, is preferably separated so that the two parts may be processed separately. The upper endpiece portion 9, as shown in Fig. XI, has a countersunk opening 17 and imperfect walls 18. The tool is passed through this opening as illustrated in Fig. VI, and the tap portion 14, as it passes through, forms a wavy or partially threaded surface 19 and as the tool is urged further into the opening the reamer portion 15 forms a finished properly sized cleared opening sufficiently large to readily receive an oversize screw such as illustrated at 20 by forming the finished wall 21 in the opening 17.

The lower endpiece portion 10 is similarly processed except that the reamer portion is not extended through this opening. This operation is illustrated in Fig. VII in which the tool is shown in position with the tap portion extending through the opening of the endpiece. In Fig. XI is illustrated the original worn thread 22 and the newly cut thread 23 formed as shown in Fig. VII.

The temple 8 has a portion 24 adapted to extend between and be held by the endpiece portions 9 and 10 and having an opening 25 therein through which the temple screw extends when the temple is in position of assembly with the endpiece. It will readily be seen that although the holding action of the endpiece on the temple is mainly a clamping action in a vertical direction and that therefore the opening 25 through the temple portion 24 is not held to such a close tolerance as the other openings in the endpiece, it may be necessary to so process the walls of the opening 25 as to permit the passage therethrough of the oversize screw 20. This is accomplished in the same manner in which the opening in the upper portion 9 of the endpiece is cleared out, as illustrated in Figs. VI and XI. In other words, the tap is first passed through the opening 25 leaving a wavy or slightly threaded surface and then the reamer portion is passed through, thus clearing out this waviness and leaving a clear surface. The tool may in this case, and also in the case as shown in Fig. VI, be passed through the opening and pulled out the other side or if desired the action may be reversed and the tool pulled out the same way it was inserted.

It is to be understood that, if desired, this tool may be used when the endpiece portions 9 and 10 are held in assembled relation as shown at 7 in Fig. I, and either with or without the temple portion 8 in assembled position. The preferred method, however, is as described above.

Also, if desired, the openings 26 and 27 may be processed in a similar manner as are the openings 17 and 17a.

The tool has a conically tapered smooth sided portion 28a which aids in initially locating the tool in the hole which is to be processed and a cylinder-like portion 29b which is adapted to lead the tool into the opening in such a way that the threads from the time they are started are in their proper angular relation with the opening wall and not shifted off at an angle which must be corrected as the tool gets further into the opening. This last mentioned action is one of the difficulties experienced in the prior art and the device of this invention overcomes that difficulty by providing portions 28a and 29b to locate and align the tool with respect to the opening so that the tap portion 14 will be in desired positional relation with the walls of the opening from the very beginning of the tapping operation. In some instances the portion 29b may be formed with a taper to aid in locating and aligning the tool, and it is to be understood that preferably the lead-in portions 28a and 29b have smooth surfaces and no edge portions which might damage the thread of an endpiece.

The tap portion 14 comprises a spiral cutting thread 28 which is broken at a plurality of positions about the periphery thereof by suitable channel or flute portions 29, as shown in Fig. V. These channel portions permit disposal of chips and are preferably of a depth which provides the remaining core portion of the cross section of the tool with a diameter which is substantially equal to that of the lead-in portion 13 and it is found that this arrangement permits the ready introduction of the threaded portions into the opening and the beginning of the cutting action on the walls thereof after the insertion of the lead-in portion 13. The depth of the channels may be varied so that one end is shallower than the other but it is preferable to have the end nearest the lead-in portion of a depth to provide the tool with a remaining cross section as described above. In this particular showing, the flute portions end at 29a in Figs. II and IV.

The tap portion 14 is tapered, as shown at 30, from the lead-in portion 13 up to the full diameter of the tool and this is shown by the relatively wider faces 31 of the spiral thread 28. The flute portions 29 extend beyond the threaded portion a substantial distance along the tool and form a reamer-like portion having cutting edges 32 thereon. This cutting edge may, if desired, be cut back, as illustrated in Fig. V, from the edge 32 to the cut back 33 to more readily permit the disposal of the chips or cut away portions of the material which is being reamed. A similar action in a different plane is brought about by the helix angle of the thread, as illustrated at 34 where the thread meets the solid portion of the tool in a longitudinal direction. This angle provides a back off portion which has a similar effect as the back off portion illustrated between 32 and 33 of Fig. V except in a different direction and enables the reaming action to be readily started by the action of the initial cutting corner 35.

The tool is tempered to produce relatively hard cutting edges throughout the tap portion of the tool, and is also tempered adjacent the meeting point of the tap portion 14 and the solid portion 15 to a relatively soft temper to provide a considerable torsional strength which will take up the strain and shock of twisting upon the holding portion 16 when the tool is being used. This is an advantage over the constructions of the prior art which in many instances often had difficulty in that if torsional strain were applied it was very likely to break particularly adjacent the point where the threaded portion 14 meets the solid portion 15. The tempering arrangement of the tool of this invention is such that considerable torsional strain may be applied to the tool without breakage.

In preparing the connection openings of the temple hinge connections 43 of the ophthalmic mounting illustrated in Fig. IX the tool as illustrated in Fig. II may be used as a tool such as illustrated in Fig. IV may be used. This tool comprises a holding portion 16, reamer portion 15, tap portion 14 and tapered lead-in portion 28a. This tool differs from that of Fig. II in that the lead-in portion 13 is omitted, and may be used as illustrated in Figs. VI, VII and VIII and in the same manner as the tool of Fig. II, in instances where the lead-in and alignment function of the conically tapered portion 28a is sufficient to properly position the tap. It is to be understood that this lead-in portion 28a has smooth conical sides with no edges which might damage the thread of the member being processed.

In preparing the connection openings of the various lens straps for the reception of oversize screws a tool such as illustrated in Fig. III is preferably used. This tool comprises a holding portion 16, tap portion 14, and lead-in portions 13 and 28a. This tool differs from that of Fig. II in that the reamer portion 15 is omitted. As in Figs. VII and X, if it is desired only to tap the hole in the endpiece or strap, this tool will readily accomplish this purpose.

The use of the tool of this invention in a rimless type mounting as illustrated in Fig. IX is shown in Fig. X. The tool is shown extending through the openings 46 and 47 of the strap ears 40 and also through the opening 48 of the lens 36 which is pressed against the spring members 49 to provide the alignment of the opening 48 with the openings 46 and 47. For this purpose a backing member 50 is provided with an opening 51 therein through which the endpiece 42 may be passed so that the strap 40 may be pressed against the backing portion 50 as shown at 52 and 53. This backing portion is merely to aid in positioning the lens so that the hole 48 therethrough is substantially in alignment with the openings 46 and 47 of the lens strap ears. The tool is then inserted in the openings so that the lead portions 28a and 29b lie within the threaded opening 47 of the strap and the tool is then worked through the strap so that the thread portions 28 retap the thread portions 54 of the strap opening 47. It is to be understood that this tool may be used as an aligning and clearing member for the assembly of a new strap and lens or it may be used as a repair tool for clearing the opening 46 sufficiently to permit the entrance therein of an oversize repair screw and also to retap the thread 54 of the opening 47 so as to permit the threading of an oversize screw therein in holding relation of an efficiency comparable to that of the original screw.

It is apparent that a tool as illustrated in Figs. II and IV might also be used in preparing the lens strap openings, if desired, care being taken, of course, that the reamer portion 15 of the tool is not brought into use.

For this purpose of permitting the use of the tool having both tap and reamer portions on work where reaming is not desired, as in Fig. X, or on work where one portion is to be tapped and the other reamed, as in Figs. VI and VII, a tool as illustrated in Fig. XII is preferable. This tool comprises lead-in portions 56 and 57, tap portion 58 and reamer portion 59 formed in the same manner as those of Fig. I.

It is to be noted that although the lens is shown in position in the strap in Fig. X, the repair tap may be made to operate on the strap openings while the lens is removed therefrom and in many instances this is the preferred method, just as it is preferred to separate the endpiece portions as illustrated in Figs. VI and VII when a repair tap is used in said portions. It is also to be understood that a repair or aligning tap may be used in any of the connection openings of the ophthalmic mounting, such as openings 26 and 27 illustrated in Figs. VI and VII or the openings through the temple connection 43 of Fig. IX. In each case where the tool of Fig. II or Fig IV is used and operated to its fullest extent through a member, the results as shown in enlargement in Fig. XI are the same, that is, the tap portion first produces a wavy or slightly tapped surface 19 and then the reamer portion produces a cleared finished surface 21.

It is to be understood that the flute portions 29 may be extended or reduced to any desired length on the tool and that this length may vary for different requirements of the tool. The taper as shown at 30 in Fig. II may also vary in its length and angle to meet the requirements of a particular job, and the cut back portions as illustrated in Fig. V between 32 and 33 may extend throughout the entire length of the tool or throughout only a portion thereof as desired. The cut back portion illustrated at 34 and 35 may be formed to a greater or lesser angle as desired.

The walls of the lead-in portions 13 and 28a on the end of the tool are preferably smooth and in cylindrical and/or conical shape as desired, although in some instances other cross sections may be used if desired and are preferably smooth.

The construction illustrated in Fig. XII provides a stop shoulder 60 which may be of any desired depth or distance from the beginning 61 of the reamer portion 59. This construction has a depressed portion 62 and the tap portion 58 has an upper tapered portion 63. The usual flutes 64 may or may not be used as desired. The portion 61 may be cut back to any desired angle.

The purpose of this construction is as follows:

In some instances it may be desirable to run this tool through endpiece portions 9 and 10 as shown in Fig. XI while the endpiece portions are in assembled relation with each other. When this is done a safety stop or shoulder 60 may be provided on the tool to prevent the reamer portion 59 from extending down into the threaded portion 17a of the endpiece because if it did extend down there it would ream out the newly cut thread and make the whole operation useless. The depressed portion 62 may or may not be used as desired and its purpose is merely to aid in separating the tap portion from the reamer portion to further safeguard the newly cut thread from the action of the reamer. The taper 63 on the tap portion 58 is the reverse of that designated at 57 so as to guide the tap portion properly through the newly threaded endpiece member when the tool is backed out. The flute 64 is shown in Fig. XII as extending in depth below the surface of the depressed portion 62 but it is to be understood that this depth may be varied as desired so that the depressed portion 62 may be fluted deeper or less or none at all. If desired the temple member may be inserted in the endpiece and cleared and the tool passed through the endpiece and temple together. The stop portion 60 may be in the form of the shoulder as shown in Fig. XII or may be in the form of a clamp ring or a knob or pin or any other suitable stop means which would readily accomplish the above purpose.

It will be seen that the depression 62 will act as a safeguard in the use of the tool as in Fig. X where it is desired to tap a member with a tool having a reamer portion without injuring the newly tapped thread with the reamer. This separation of tap and reamer portions is a safety factor.

From the foregoing description it will be seen that I have provided new and efficient means and method of processing the walls of an opening.

Having described my invention, I claim:

1. A tool member comprising a pilot portion having substantially parallel sides, a substantially conical portion adjacent one end of the pilot member to act as a guide therefor, said pilot and conical portions each having continuous uninterrupted surfaces, a lead-in portion having inclined sides with cutting edges thereon, said lead-in portion being contiguous with the opposing end of the pilot portion of the tool, a thread processing portion adjacent the lead-in portion, said thread processing portion comprising a plurality of helically arranged thread forming convolutions, and an integral portion adjacent the thread processing portions of a maximum diameter substantially equivalent to that of the maximum diameter of the thread processing portion.

2. A tool member comprising a pilot portion having substantially parallel sides, a substantially conical portion adjacent one end of the pilot member to act as a guide therefor, a lead-in portion having inclined sides with cutting edges thereon, said lead-in portion being contiguous with the opposing end of the pilot portion of the tool, a thread processing portion adjacent the lead-in portion, said thread processing portion comprising a plurality of interrupted helical convolutions, and a reamer-like portion adjacent the interrupted helical convolutions with the greatest diameter of the reamer-like portion being substantially equivalent to the greatest diameter of said interrupted convolutions.

3. A tool member comprising a pilot portion having substantially parallel sides, a substantially conical portion adjacent one end of the pilot member to act as a guide therefor, a lead-in portion having inclined sides with cutting edges thereon, said lead-in portion being contiguous with the opposing end of the pilot portion of the tool, a thread processing portion adjacent the lead-in portion, said thread processing portion comprising a plurality of interrupted helical convolutions, a reamer-like portion adjacent the interrupted helical convolutions with the greatest diameter of the reamer-like portion being substantially equivalent to the greatest diameter of said interrupted convolutions, and a shank portion adjacent the reamer-like portion having a diameter substantially equivalent to that of said reamer-like portion.

4. A tool member comprising a pilot portion having substantially parallel sides with a continuous uninterrupted surface and a substantially circular cross section, a substantially conical portion adjacent one end of the pilot member having a continuous uninterrupted surface and being of a substantially circular cross-section to act as a guide for said pilot member, a lead-in portion having inclined sides with cutting edges thereon, said lead-in portion being contiguous with the opposing end of the pilot portion of the tool, a thread processing portion adjacent the lead-in portion, said thread processing portion comprising a plurality of helically arranged thread forming convolutions with a portion of said thread forming convolutions being of substantially the same diameter throughout the portion thereof opposite the lead-in portion and an integral portion adjacent the thread processing portion of a maximum diameter substantially equivalent to that of the maximum diameter of the substantially equal diameter portion of the thread processing portion.

LAWRENCE POETON.